United States Patent
Thompson et al.

(10) Patent No.: US 12,131,046 B1
(45) Date of Patent: Oct. 29, 2024

(54) CLONE VOLUME SPLIT OF CLONE VOLUME FROM PARENT VOLUME WITH DATA TIERED TO OBJECT STORE

(71) Applicant: NetApp Inc., San Jose, CA (US)

(72) Inventors: Cheryl Marie Thompson, Sunnyvale, CA (US); Garima Choudhary, San Jose, CA (US); Rajesh Sudarsan, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/308,703

(22) Filed: Apr. 28, 2023

(51) Int. Cl.
*G06F 3/06* (2006.01)

(52) U.S. Cl.
CPC .......... *G06F 3/0644* (2013.01); *G06F 3/0608* (2013.01)

(58) Field of Classification Search
CPC .......... G06F 3/06; G06F 3/064; G06F 3/0608; G06F 3/061; G06F 3/0617
See application file for complete search history.

(56) References Cited

U.S. PATENT DOCUMENTS

| | | |
|---|---|---|
| 7,913,051 B1 | 3/2011 | Todd et al. |
| 10,031,682 B1 | 7/2018 | George et al. |
| 10,360,099 B2 | 7/2019 | Subramanian et al. |
| 10,852,976 B2 | 12/2020 | George et al. |
| 11,016,943 B2 | 5/2021 | George et al. |
| 11,144,498 B2 | 10/2021 | George et al. |
| 11,188,500 B2 | 11/2021 | Kushwah et al. |
| 2007/0016740 A1 | 1/2007 | Somavarapu |
| 2009/0222596 A1 | 9/2009 | Flynn et al. |
| 2017/0004046 A1* | 1/2017 | Adkins ............ G06F 16/17 |
| 2017/0185531 A9* | 6/2017 | Chen ............ G06F 21/6218 |
| 2019/0220454 A1* | 7/2019 | Matsui ............ G06F 15/16 |
| 2020/0285611 A1 | 9/2020 | George et al. |

(Continued)

FOREIGN PATENT DOCUMENTS

| | | | | |
|---|---|---|---|---|
| EP | 2372520 A1 | * | 10/2011 | ......... G06F 11/1084 |
| WO | WO-2005111802 A2 | * | 11/2005 | ............ G06F 16/10 |
| WO | WO-2017146805 A1 | * | 8/2017 | ......... G06F 12/0246 |

OTHER PUBLICATIONS

N. Tsantalis, D. Mazinanian and G. P. Krishnan, "Assessing the Refactorability of Software Clones," in IEEE Transactions on Software Engineering, vol. 41, No. 11, pp. 1055-1090, Nov. 1, 2015.*

(Continued)

*Primary Examiner* — Pierre Michel Bataille
(74) *Attorney, Agent, or Firm* — Cooper Legal Group, LLC

(57) ABSTRACT

Techniques are provided for splitting a clone volume from a parent volume whose data is stored within objects of an object store. A transfer map is used to track mappings of selectively created child object identifiers used to subsequently copy the one or more parent objects to create child objects corresponding to the child object identifiers. A consistency point phase is performed. For each child object identifier processed during the consistency point phase, an object state for a corresponding child object is set to a copy pending state. A reverse map is populated with a reverse map entry. The transfer map is traversed to copy the one or more parent objects as the child objects for splitting the clone volume from the parent volume. The reverse map is used to verify that the child objects are successfully created with valid data.

20 Claims, 10 Drawing Sheets

(56) References Cited

U.S. PATENT DOCUMENTS

2020/0285613 A1    9/2020   George et al.
2020/0285614 A1    9/2020   George et al.

OTHER PUBLICATIONS

H. A. Nguyen, T. T. Nguyen, N. H. Pham, J. Al-Kofahi and T. N. Nguyen, "Clone Management for Evolving Software," in IEEE Transactions on Software Engineering, vol. 38, No. 5, pp. 1008-1026, Sep.-Oct. 2012.*
U.S. Appl. No. 18/308,704, filed Apr. 28, 2023, Thompson et al.
Notice of Allowance mailed on Jul. 18, 2024 for U.S. Appl. No. 18/308,704, filed Apr. 28, 2023, 08 pages.

\* cited by examiner

CLONE VOLUME SPLIT OF CLONE VOLUME FROM PARENT VOLUME WITH DATA TIERED TO OBJECT STORE

BACKGROUND

Many storage systems may provide tiering capabilities where data of a primary volume can be tiered (or stored) out to different storage tiers. One of the storage tiers may include an object store where data of the primary volume is stored within objects. The storage systems may also provide other storage capabilities such as the ability to create clone volumes of the primary volume. When a clone volume of the primary volume is created, the clone volume references the original data of the primary volume. This makes the clone volume storage efficient because the data of the primary volume is not copied for the clone volume.

DESCRIPTION OF THE DRAWINGS

Embodiments/aspects of the present technology will be described and explained through the use of the accompanying drawings in which.

Figure 1:
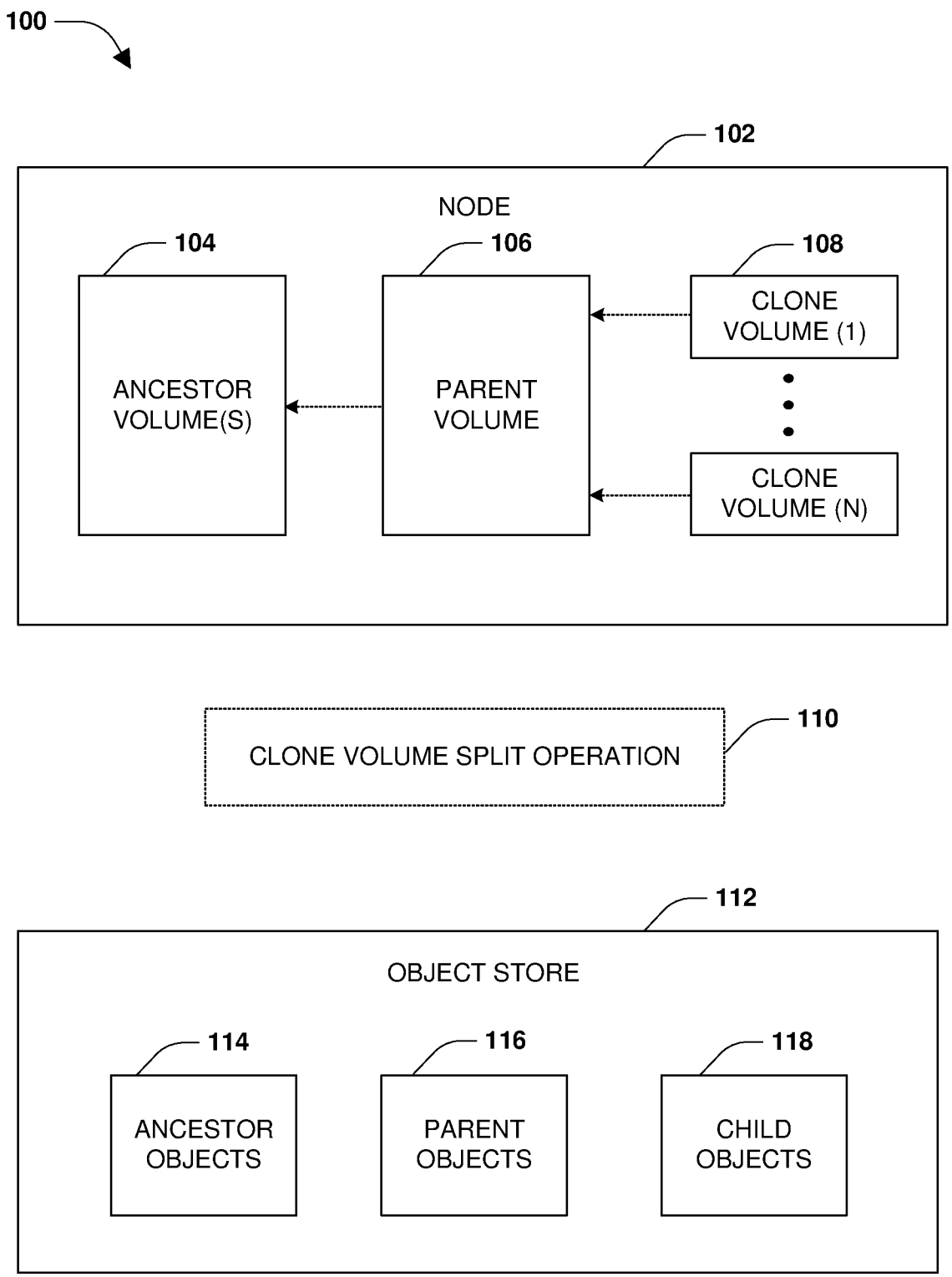
FIG. 1 is a block diagram illustrating an example of performing a clone volume split operation, in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

An object store may provide long term, scalable, and efficient storage where data is stored within objects. The object store may be hosted on-premise or may be hosted by a cloud service provider. A storage system (e.g., a hybrid storage system) hosting a primary volume may tier out (i.e., store) data of the primary volume to the object store. For example, the storage system may tier out less frequently accessed data of the primary volume to the object store for long term cheaper storage compared to a performance tier of faster storage where more frequently accessed data of the primary volume may be stored. The storage system makes the primary volume accessible to client systems for accessing data of the primary volume stored within one or more storage tiers.

The storage system may provide cloning functionality to create clone volumes of a volume. A volume being cloned may be referred to as a parent volume. The creation of a clone volume from a parent volume is quick and storage efficient because the underlying data of the parent volume is not copied/duplicated for the clone volume, which conserves storage space and allows for almost instantaneous creation of any number of clone volumes. Instead of copying the parent volume data, the clone volume initially references (or points to) the data of the parent volume. As changes are made to the parent volume or the clone volume (the volumes diverge from one another), separate copies of data are made so that changes to the clone volume do not modify data of the parent volume and changes to the parent volume do not modify data of the clone volume. In some instances, the parent volume may be a clone of another volume (also referred to as an ancestor volume), which in turn could also be a clone of a different volume, etc.

A clone volume split operation may be performed to split the clone volume from the parent volume. To split the clone volume from the parent volume, any parent data of the parent volume that is referenced by the clone volume is copied to create clone data (child objects) that is part of the clone volume separate from the parent volume. This results in the clone volume becoming a standalone volume that no longer references the data of the parent object.

If the data of the parent volume has been stored within parent objects of an object store (e.g., an object store hosted by a cloud storage provider remotely accessible over a network to a node providing clients with access to the parent volume and the clone volume), then the parent objects are retrieved over the network from the object store, copied as child objects, and then stored back into the object store over the network. This results in a substantial amount of network usage, time, and operations (may also be referred to as "ops") (e.g., a read, a copy, and a store operation for a single object) that is costly (e.g., the cloud storage provider may charge per operation).

Accordingly, the techniques provided herein improve the overall efficiency of clone volume split operations reducing network usage, time, number of ops, and overall cost of a clone volume split operation. The clone volume split operation is improved by utilizing a transfer map and a reverse map to quickly determine what child objects are to be created within the object store, and then copy instructions are issued to the object store to copy corresponding parent objects as the child objects without retrieving the parent objects from the object store, copying the parent objects as child objects, and storing the child objects back into the object store.

FIG. 1 is a block diagram illustrating an example of a system 100 for performing a clone volume split operation 110. A node 102 may host one or more volumes that are made accessible to client systems. The node 102 may be implemented as a virtual machine, a container, a serverless thread, a server, hardware, software, or a combination thereof. The node 102 may be hosted on-premise (e.g., within a same network as the clients), within a cloud computing environment, or elsewhere. A parent volume 106 may be hosted by the node 102 that provides the clients with access to the parent volume 106. At least some data of the parent volume 106 may be tiered out (i.e., stored) to an object store 112 (e.g., an object store hosted on-premise or remotely hosted by a cloud storage environment). The data of the parent volume 106 may be stored within parent objects 116 tiered out to the object store 112. The data may be stored within slots of a parent object, and a slot header of the parent object (or a separate metafile) may comprise metadata describing the slots (e.g., how to locate the data within a slot, what data of the parent volume 106 is stored within the slot, whether data within the slot is compressed, how to decompress the data in the slot, checksum or other information used to check the integrity of the parent object and/or data within the slots of the parent object, and/or whether data in a slot is in-use or no longer used or referenced, etc.). In some embodiments, all the data of the parent volume 106 is tiered out to the object store 112. In some embodiments, some of the data of the parent volume 106 is tiered out to the object store 112 and some of the data of the parent volume 106 is maintained local to the node 102 such as within an on-premise, performance storage tier.

Volume cloning functionality may be used to create any number of clone volumes of the parent volume 106, such as a first clone volume 108. Instead of copying the data of the parent volume 106, which could be tiered to the object store 112 within the parent objects 116, the first clone volume 108 initially references the data of the parent volume 106. As changes are made to the parent volume 106, the changes are separately stored for the parent volume 106 so that the changes do not modify the first clone volume 108. As changes are made to the first clone volume 108, the changes are stored for the first clone volume 108 so that the changes do not modify the parent volume 106. The changes made to the first clone volume 108 may also be tiered out to the object store 112 within child objects 118. In some embodiments, the parent volume 106 may be a clone of another volume such as an ancestor volume 104 whose data may be tiered to the object store 112 within ancestor objects 114.

A clone volume split operation 110 may be performed to split the first clone volume 108 from the parent volume 106. The clone volume split operation 110 identifies data of the parent volume 106 that is still referenced by the first clone volume 108. The clone volume split operation 110 copies that data of the parent volume 106 to create copies of the data that are now part of the first clone volume 108. In this way, the first clone volume 108 becomes a standalone volume that no longer references data of other volumes such as the parent volume 106. The clone volume split operation 110 becomes complicated and technically challenging when some of the data of the parent volume 106 is tiered out to the object store 112 and stored within the parent objects 116. As will be further discussed in relation to method 200 of FIG. 2, the clone volume split operation 110 is improved to split a clone volume more efficiently and quickly from a parent volume whose data is tiered to the object store 112.

Figure 2:
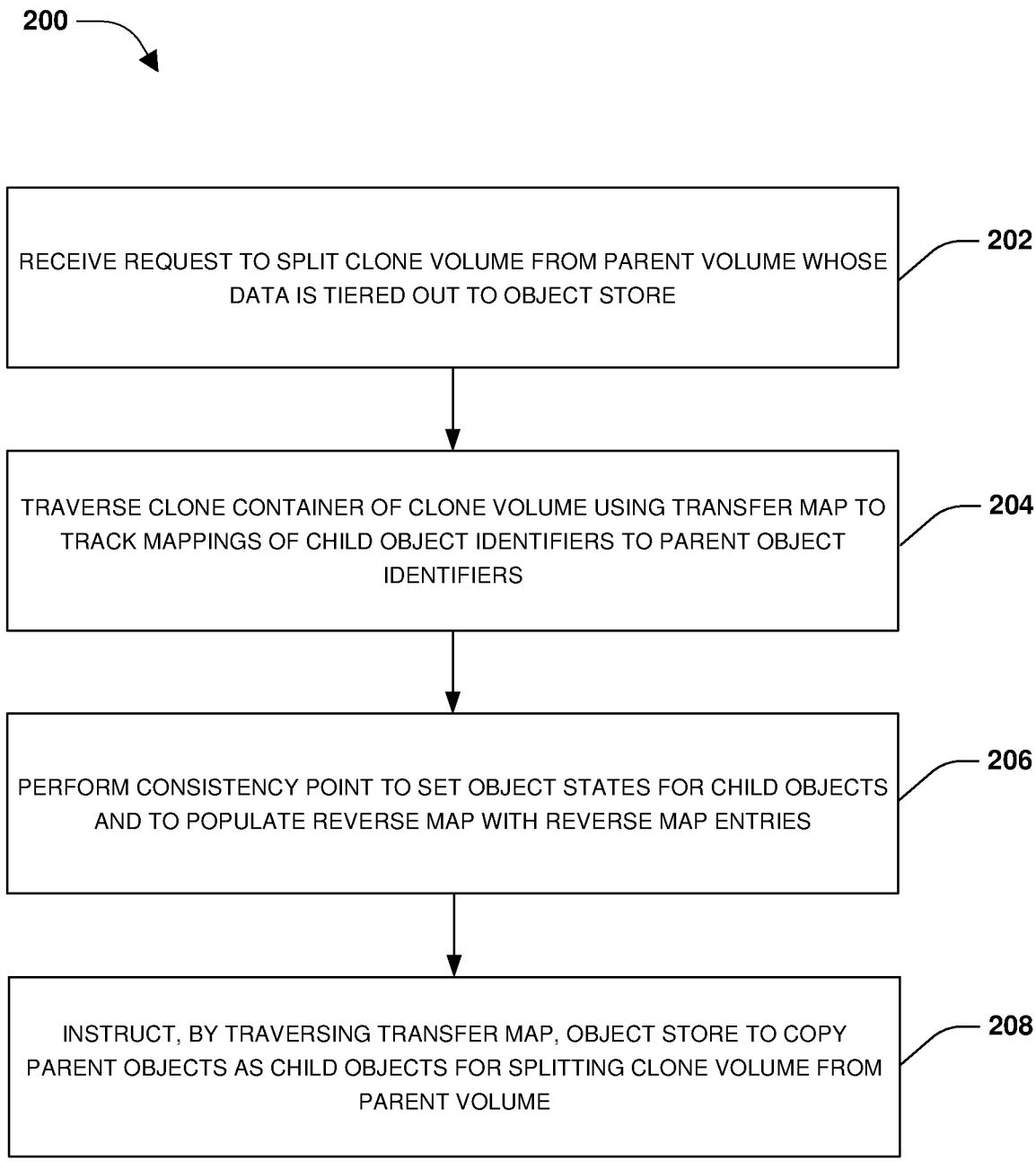
FIG. 2 is a flow chart illustrating an example of a set of operations of a method for performing a clone volume split operation, in accordance with various embodiments of the present technology.
Figure 3A:
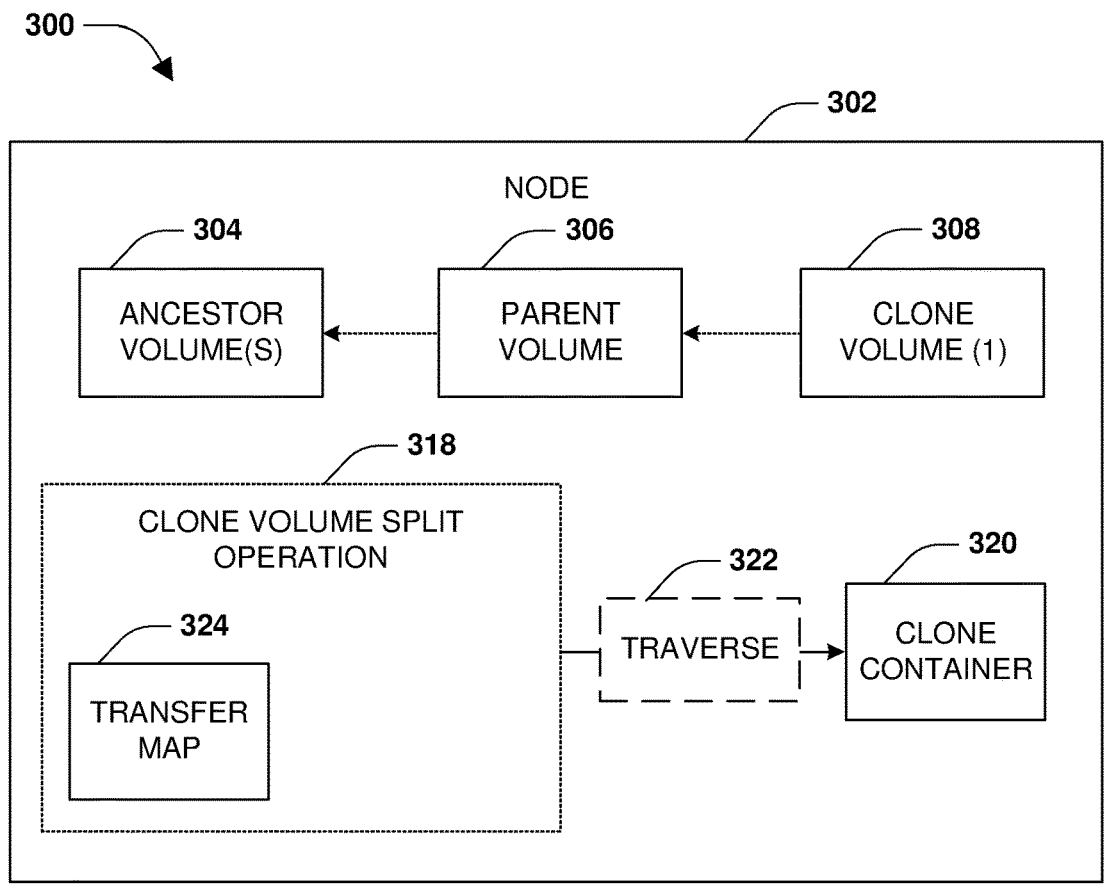
FIG. 3A is a block diagram illustrating an example of performing a clone volume split operation where a transfer map is created, in accordance with an embodiment of the present technology.
Figure 3A:
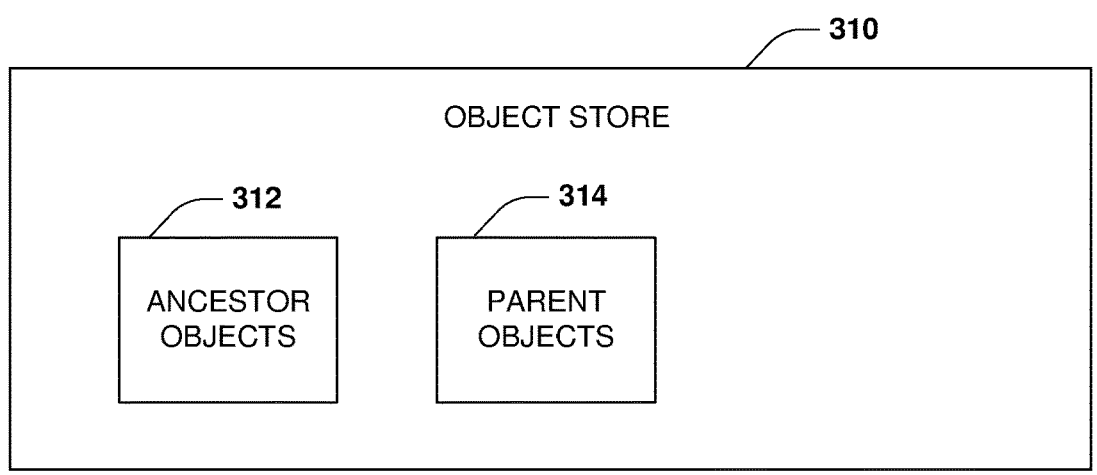
Figure 3B:
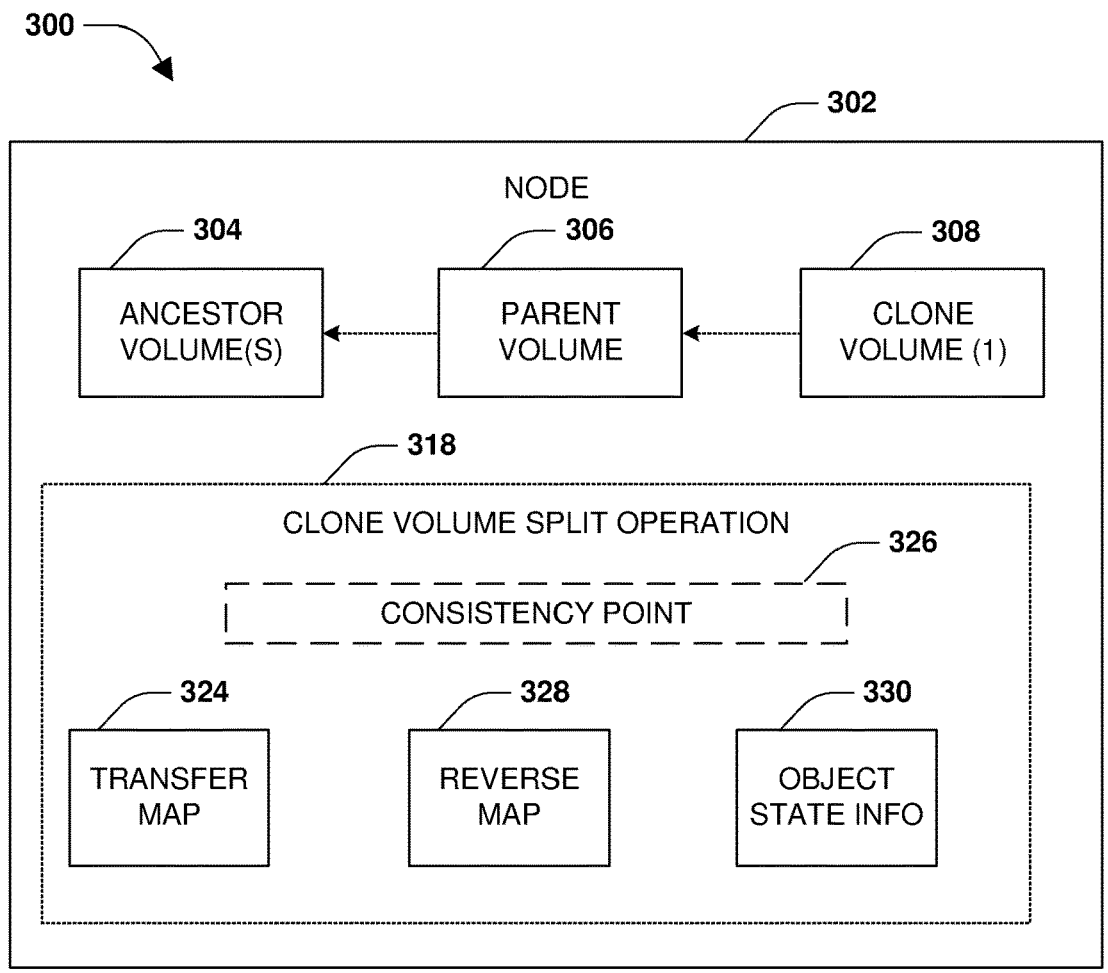
FIG. 3B is a block diagram illustrating an example of performing a clone volume split operation where a consistency point is performed, in accordance with an embodiment of the present technology.
Figure 3B:
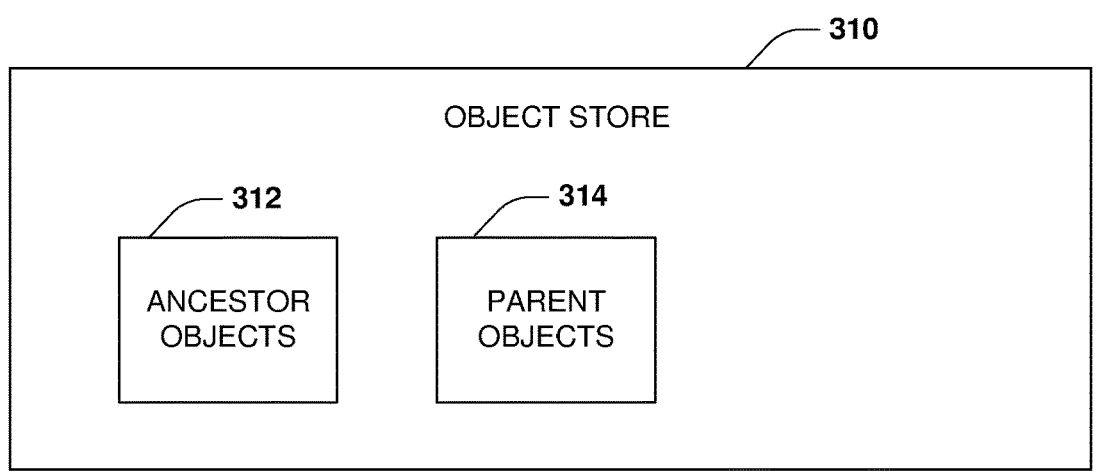
Figure 3C:
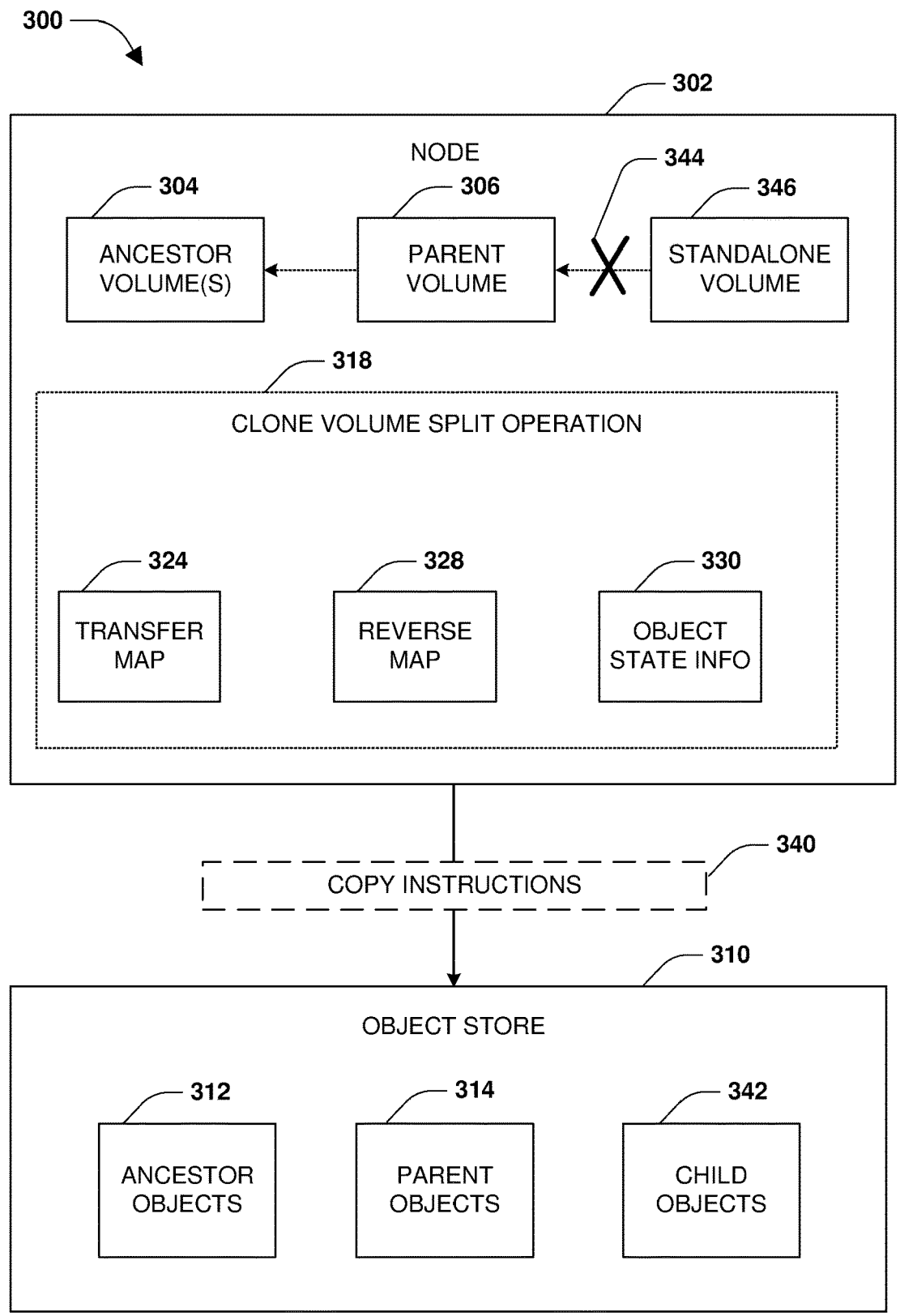
FIG. 3C is a block diagram illustrating an example of performing a clone volume split operation where copy instructions are transmitted to an object store, in accordance with an embodiment of the present technology.

FIG. 2 is a flow chart illustrating an example of a set of operations of a method 200 for performing a clone volume split operation, which is described in relation to system 300 of FIGS. 3A-3C. A node 302 may host a parent volume 306 whose data has been tiered to an object store 310 within parent objects 314, as illustrated by FIG. 3A. In some embodiments, the parent volume 306 may be a clone of an ancestor volume 304 whose data may be tiered to the object store 310 within ancestor objects 312. In some embodiments, the parent volume 306 is not a clone of any other volume and is thus a standalone volume. A first clone volume 308 may be created as a clone of the parent volume 306, and thus the first clone volume 308 may reference (point to) at least some data of the parent volume 306 that may be stored within the parent objects 314 and/or may reference at least some data of the ancestor volume 304 stored within the ancestor objects 312 if the parent volume 306 is a clone of the ancestor volume 304.

During operation 202 of method 200, a request may be received by the node 302 to split the first clone volume 308 from the parent volume 306 so that the first clone volume 308 becomes a standalone volume. Accordingly, a clone volume split operation 318 is executed in response to the request. As part of executing the clone volume split operation 318, a clone container 320 of the first clone volume 308 may be traversed 322 for selectively creating child object identifiers, during operation 204 of method 200. The child object identifiers will be subsequently used to copy the parent objects 314 to create child objects that will be assigned the child object identifiers. Because data of the parent volume 306 and/or data of the first clone volume 308 may not be shared since the parent volume 306 and the first clone volume 308 can diverge over time, only certain parent objects will need to be copied as part of splitting the first clone volume 308 from the parent volume 306.

While traversing 322 the clone container 320, a transfer map 324 is used to track mappings of child object identifiers to parent object identifiers. In particular, an object (e.g., a parent object) may store 1024 blocks or any other number of blocks of data. If one of the blocks within the object is encountered by the traversal 322, then that block triggers the creation of a child object identifier. If the traversal 322 encounters a different one of the blocks within the object, then another child object identifier should not be created since there is already a child object identifier that was created for the object. In response to the transfer map 324 indicating that a parent object has not yet been encountered by the traversal 322, a child object identifier is created. A mapping between the child object identifier and a parent object identifier of the parent object is populated into the transfer map 324. In response to the transfer map 324 indicating that the parent object has not yet been encountered by the traversal 322, the child object identifier is created, and the clone container 320 is updated with a cloud block number for the child object identifier. In this way, the clone container 320 is updated to point to block information for the child object that will be created (e.g., a clone container L1 (level 1) block is updated with a cloud physical volume block number for the child object identifier). In response to the transfer map 324 indicating that the parent object was already encountered by the traversal 322, a new child object identifier is not created.

In some embodiments of performing the traversal 322, a determination is made as to whether an object block information ("info") hash has a hash entry for a child object identifier created during the traversal 322. In response to the object block info hash not having a hash entry for the child object identifier, the child object identifier, and a parent object identifier block info (of a parent object that will be copied to create a child object having the child object identifier) are added together into the object block info hash. In response to the object block info hash having a hash entry for the child object identifier, a reference count for the hash entry is updated (e.g., incremented). The object block info hash is created for use during a subsequent consistency point where each child object identifier within the object block info hash is processed.

During operation 206 of method 200, a consistency point 326 is performed, as illustrated by FIG. 3B. As part of performing the consistency point 326, each child object identifier created during the traversal 322 and tracked within the object block info hash is processed. In some embodiments, the consistency point 326 is performed using the hash entries within the object block info hash (hash entries for the child object identifiers). For a child object identifier to be subsequently assigned to a child object after the consistency point 326, an object state for a child object is set to a "copy pending state." The copy pending state indicates that a corresponding parent object has not yet been copied (but is set to be copied) to create the child object. The object state may be tracked within object state info 330. A reference count for the parent object to be copied is incremented. Also, a reverse map 328 is populated with a reverse map entry that includes the child object identifier for the child object, a parent object identifier of the parent object to copy as the child object, a sequence number of the parent object (e.g., each object stored within the object store 310 may be assigned a unique sequence number such as monotonically increasing sequence numbers for each newly created object), and/or an identifier of the parent object (e.g., a buffer tree universal unique identifier (BTUUID) that identifies a buftree, of a file, that comprises indirect blocks for the file such that the indirect blocks of the buftree can locate data of the file). If the parent object is a copy of a different object (one of the ancestor objects 312) due to the parent volume 306 being a copy of the ancestor volume 304, the reverse map entry may be populated with information from a parent reverse map (not shown) of the parent object. Otherwise, the reverse map entry is populated with information from the parent object if the parent object is not a copy of another object.

During operation 208 of method 200, the clone volume split operation 318 generates and transmits copy instructions 340 to the object store 310 to copy the parent objects 314 as the child objects 342 for splitting 344 the first clone volume 308 from the parent volume 306 to create a standalone volume 346, as illustrated by FIG. 3C. In particular, the clone volume split operation 318 may traverse the transfer map 324 of mappings between parent object identifiers and child object identifiers to create the copy instructions 340. A copy instruction may comprise a command for the object store 310 to copy a parent object, having the parent object identifier specified by the command, to create a child object that is assigned the child object identifier specified by the command. In some embodiments, a child object identifier is obtained from the transfer map 324. The child object identifier is added to a pending queue used to track child object identifiers for which copy instructions are to be or have been transmitted to the object store 310 for creation of corresponding child objects. A copy operation for the child object is transmitted to the object store 310 with a command instructing the object store 310 to copy a parent object, having a parent object identifier specified by the command, as the child object. The child object identifier is removed from the pending queue based upon the child object being verified using information within the reverse map 328.

The reverse map 328 is used to verify that the child objects 342 are successfully created by the object store 310 with valid data. For a particular child object, the reverse map 328 comprises a child object identifier for the child object, a parent object identifier of a parent object copied as the child object, a sequence number of the parent object, and an identifier of the parent object. This information can be used to identify the parent object and the child object within the object store 310 to verify that the child object comprises an exact copy of the parent object.

Because the object store 310 is in-place copying the parent objects 314 while the parent objects 314 are resident within the object store 310 without moving or transferring the parent objects 314 (e.g., creation of the child objects 342 do not move the parent objects 314 from a storage bucket where the parent objects 314 reside), the clone volume split operation 318 reduces network bandwidth, time, processing resources, and cost because the parent objects 314 are not being retrieved by the node 302 over a network from the object store 310, locally copied by the node 302, and then transmitted back over the network to the object store 310 as the child objects 342.

Figure 4:
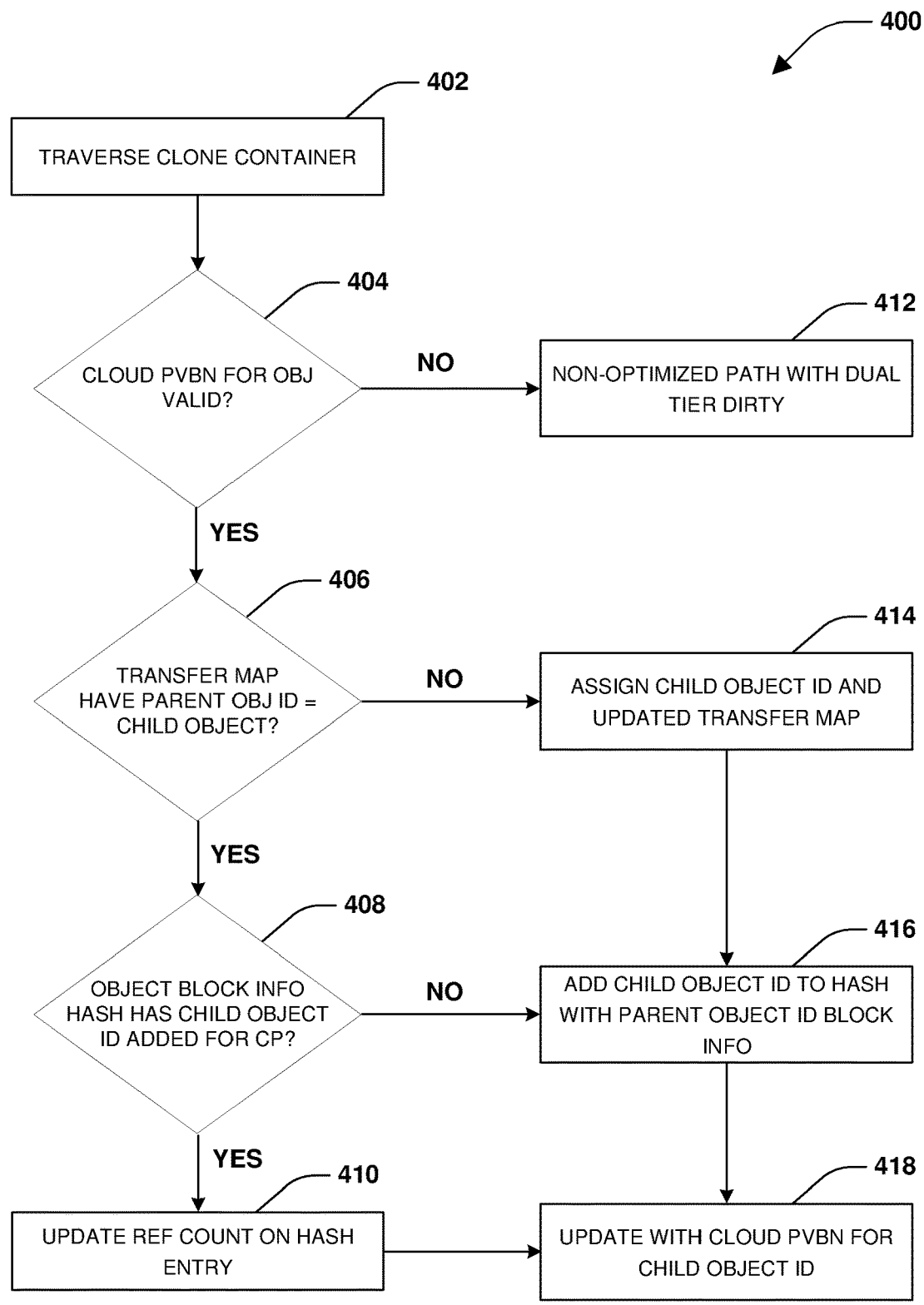
FIG. 4 is a flow chart illustrating an example of a set of operations of a method for performing a clone volume split operation, in accordance with various embodiments of the present technology.

FIG. 4 is a flow chart illustrating an example of a set of operations of a method 400 for performing a clone volume split operation to split a clone volume from a parent volume to transform the clone volume into a standalone volume. During operation 402 of method 400, a clone container of the clone volume is traversed. In operation 404 of method 400, when a cloud physical volume block number for an object (e.g., a parent object whose data is referenced/pointed to by the clone volume) is encountered during the traversal, a determination is made whether the cloud physical volume block number is valid. If the cloud physical volume block number is invalid, then a non-optimized path with dual tier dirty notification is generated, during operation 412 of method 400. Dual tier dirty is a feature that allows the child object to be written without having to deal with a tiering scanner. Non-optimized path relates to where copy instructions are not used to copy a parent object to a child object. Instead, a dual-tier-dirty path is used to issue GET instructions from the parent object to read data of the parent object and then issues PUT instructions to write data of the parent object to the new child object.

If the cloud physical volume block number is valid, then in operation 406 of method 400, a determination is made whether a transfer map has a mapping between a parent object identifier (e.g., of the parent object having the cloud physical volume block number) and a child object identifier created for a child object that is to be subsequently created by copying the parent object.

If the transfer map does not already have the mapping, then in operation 414 of method 400, a child object identifier is created/assigned. The transfer map is updated with a mapping for the assigned child object identifier and the parent object identifier. Also, in operation 416 of method 400, the child object identifier is added to a hash entry within an object block info hash, along with parent object ID block information of the parent object, and/or other information (e.g., parent sequence number, slot in the object, encryption name format version, object format version, encryption related fields, slot header info, info on whether the object is a copy, etc.).

During operation 408 of method 400, if the transfer map already has the mapping, then a determination is made whether the object block info hash has the child object identifier added for a consistency point that is to be subsequently performed. If the object block info hash does not have the child object identifier added for the consistency point, then in operation 416 of method 400, the child object identifier is added to a hash entry within the object block info hash, along with parent object ID block information of the parent object and the process moves to operation 418. If the object block info hash already has the child object identifier added for consistency point, then in operation 410 of method 400 a reference count on the hash entry is updated (e.g., incremented). Thereafter, in operation 418, an update with the cloud physical volume block number for the child object identifier is performed (e.g., update clone container indirect block metadata).

Figure 5:
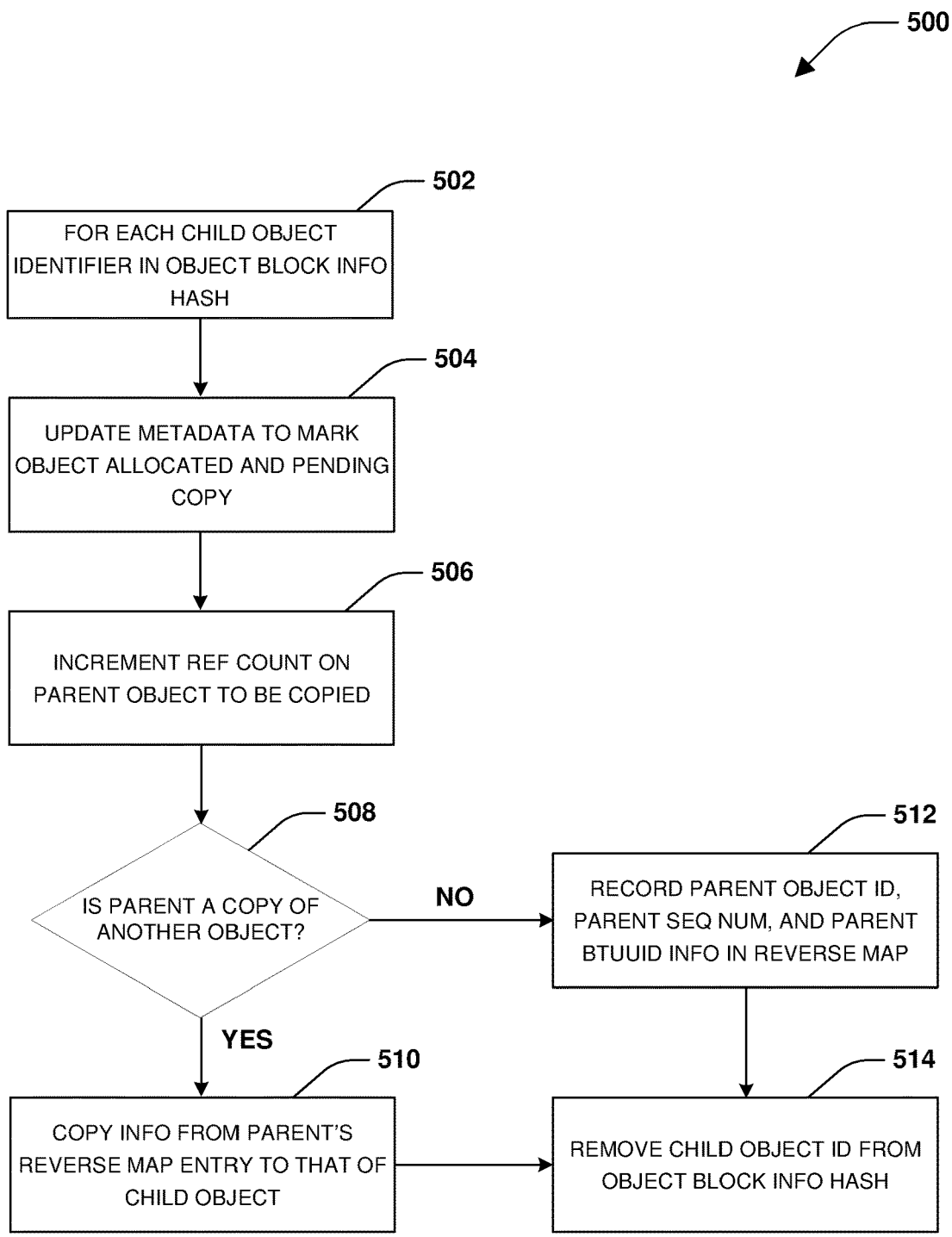
FIG. 5 is a flow chart illustrating an example of a set of operations of a method for performing a clone volume split operation, in accordance with various embodiments of the present technology.

FIG. 5 is a flow chart illustrating an example of a set of operations of a method 500 for performing a clone volume split operation to split a clone volume from a parent volume to transform the clone volume into a standalone volume. Method 500 begins in operation 502 when each child object identifier within the object block info hash is processed. As part of the processing, in operation 504 of method 500, a child object identifier, metadata is updated to mark a child object (a child object that will be subsequently created and assigned the child object identifier) as allocated and pending for copy. A reference count for the parent object to be copied as the child object is incremented, during operation 506 of method 500. Each object can represent 1024 4 k blocks using 1024 slots, and the reference count indicates how many blocks an object is representing (e.g., how many slots of the 1024 slots are filled with data). In operation 508 of method 500, a determination is made whether the parent object is a copy of another object (e.g., an ancestor object). If the parent object is not a copy of another object, then in operation 512 of method 500, a reverse map is populated with a parent object identifier of the parent object, a sequence number of the parent object, buffer tree identifier (BTUUID) info of the parent object, and the child object identifier. If the parent object is a copy of an ancestor object, then in operation 510 of method 500, a reverse map entry of the parent object is copied to that of the child object (the reverse map is populated with a reverse map entry between the parent object and the ancestor object). Thereafter, in operation 514 of method 500, processing the child object identifier is finished and the child object identifier is removed from the object block info hash. The reverse map created by method 500 and the transfer map created by method 400 are then used by a clone volume split operation to split the clone volume from the parent volume, such as by using the techniques previously discussed in relation to FIGS. 2 and 3A-3C.

Figure 6:
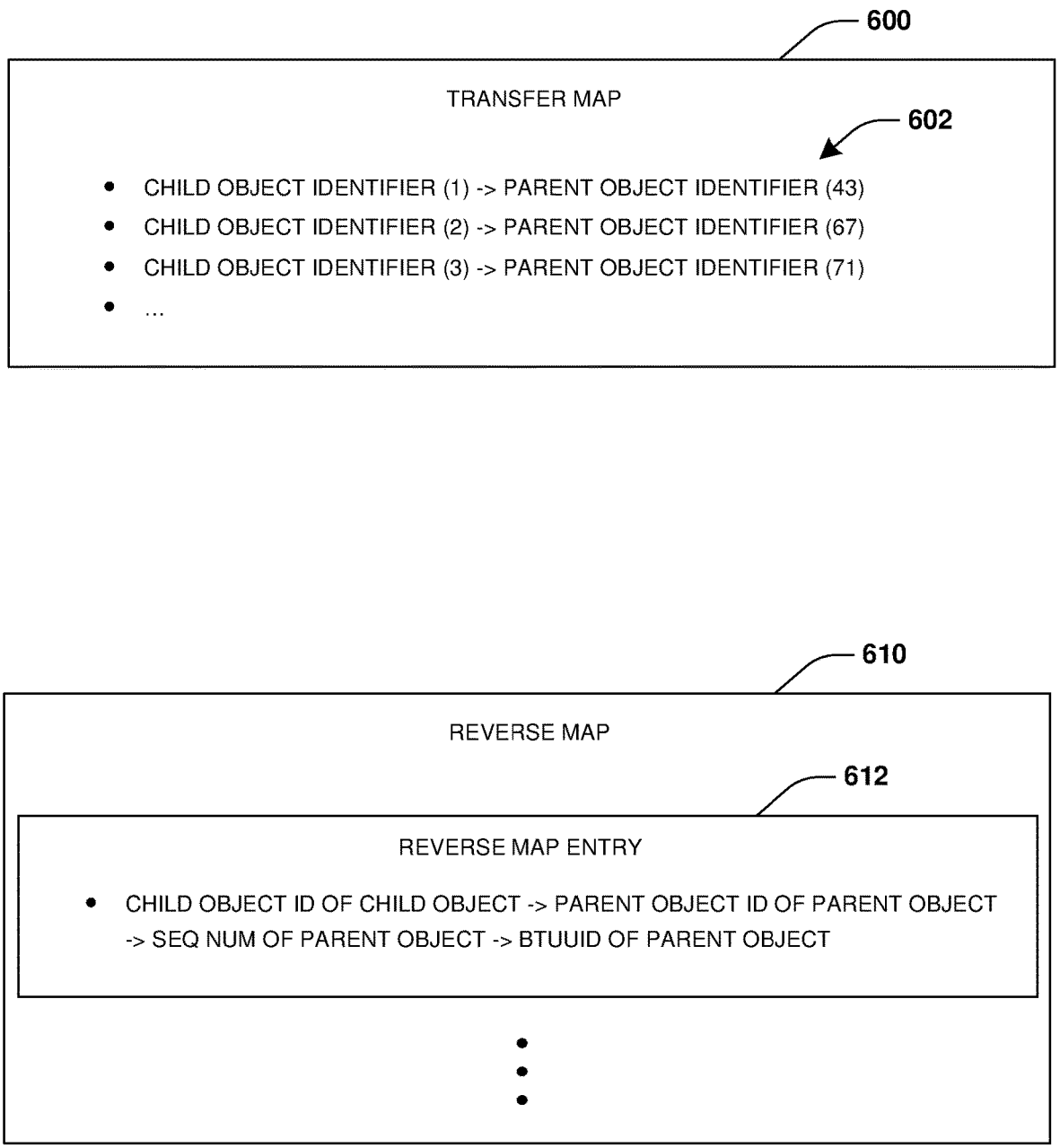
FIG. 6 is an example of a transfer map and a reverse map, in accordance with various embodiments of the present technology.

FIG. 6 is an example of a transfer map 600 and a reverse map 610. The transfer map 600 is used to track/store mappings 602 between child object identifiers and parent object identifiers. As discussed above, the child object identifiers are created for child objects that are created by copying parent objects with corresponding parent object identifiers mapped to the child object identifiers. The reverse map 610 is populated with reverse map entries used to validate the creation of child objects and whether the child objects comprise valid data. For example, the reverse map 610 may be populated with a reverse map entry 612 comprising a child object identifier of a child object, a parent object identifier of a parent object, a sequence number of the parent object, and/or a buffer tree unique identifier (BTUUID) of the parent object.

Figure 7:
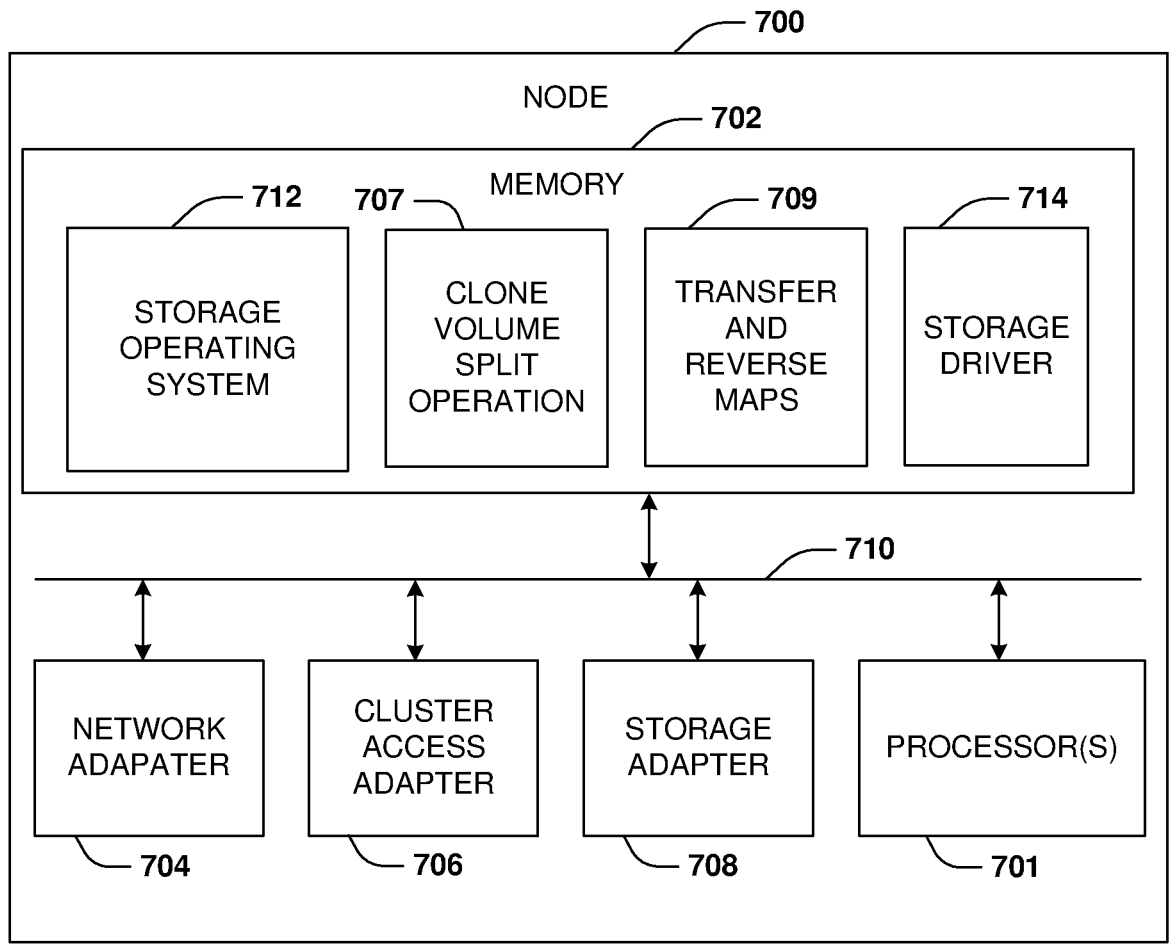
FIG. 7 is a block diagram illustrating an example of a node in accordance with various embodiments of the present technology.

FIG. 7 is a block diagram illustrating an example of a node in accordance with various embodiments of the present technology.

Referring to FIG. 7, a node 700 in this particular example includes processor(s) 701, a memory 702, a network adapter 704, a cluster access adapter 706, and a storage adapter 708 interconnected by a system bus 710. In other examples, the node 700 comprises a virtual machine, such as a virtual storage machine.

The node 700 also includes a storage operating system 712 installed in the memory 702 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 704 in this example includes the mechanical, electrical and signaling circuitry needed to connect the node 700 to one or more of the client devices over network connections, which may comprise, among other things, a point-to-point connection or a shared medium, such as a local area network. In some examples, the network adapter 704 further communicates (e.g., using TCP/IP) via a cluster fabric and/or another network (e.g., a WAN) (not shown) with storage devices of a distributed storage system to process storage operations associated with data stored thereon.

The storage adapter 708 cooperates with the storage operating system 712 executing on the node 700 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 708 can include I/O interface circuitry that couples to the disks over an I/O interconnect arrangement, such as a storage area network (SAN) protocol (e.g., Small Computer System Interface (SCSI), Internet SCSI (ISCSI), hyperSCSI, Fiber Channel Protocol (FCP)). The information is retrieved by the storage adapter 708 and, if necessary, processed by the processor(s) 701 (or the storage adapter 708 itself) prior to being forwarded over the system bus 710 to the network adapter 704 (and/or the cluster access adapter 706 if sending to another node computing device in the cluster) where the information is formatted into a data packet and returned to a requesting one of the client devices and/or sent to another node computing device attached via a cluster fabric. In some examples, a storage driver 714 in the memory 702 interfaces with the storage adapter to facilitate interactions with the data storage devices.

The storage operating system 712 can also manage communications for the node 700 among other devices that may be in a clustered network, such as attached to the cluster fabric. Thus, the node 700 can respond to client device requests to manage data on one of the data storage devices or storage devices of the distributed storage system in accordance with the client device requests.

A file system module of the storage operating system 712 can establish and manage one or more file systems including software code and data structures that implement a persistent hierarchical namespace of files and directories, for example.

As an example, when a new data storage device (not shown) is added to a clustered network system, the file system module is informed where, in an existing directory tree, new files associated with the new data storage device are to be stored. This is often referred to as "mounting" a file system.

In the example node 700, memory 702 can include storage locations that are addressable by the processor(s) 701 and adapters 704, 706, and 708 for storing related software application code and data structures. The processor(s) 701 and adapters 704, 706, and 708 may, for example, include processing elements and/or logic circuitry configured to execute the software code and manipulate the data structures.

The storage operating system 712, portions of which are typically resident in the memory 702 and executed by the processor(s) 701, invokes storage operations in support of a file service implemented by the node 700. Other processing and memory mechanisms, including various computer readable media, may be used for storing and/or executing application instructions pertaining to the techniques described and illustrated herein. For example, the storage operating system 712 can also utilize one or more control files (not shown) to aid in the provisioning of virtual machines.

In some embodiments, instructions for performing a clone volume split operation 707 may be stored within the memory 702 of the node 700 and executed by the processor(s) 701. As part of executing the clone volume split operation 707, transfer and reverse maps 709 may be created and stored within the memory 702.

The examples of the technology described and illustrated herein may be embodied as one or more non-transitory computer or machine readable media, such as the memory 702, having machine or processor-executable instructions stored thereon for one or more aspects of the present technology, which when executed by processor(s), such as processor(s) 701, cause the processor(s) to carry out the steps necessary to implement the methods of this technology, as described and illustrated with the examples herein. In some examples, the executable instructions are configured to perform one or more steps of a method described and illustrated later.

Figure 8:
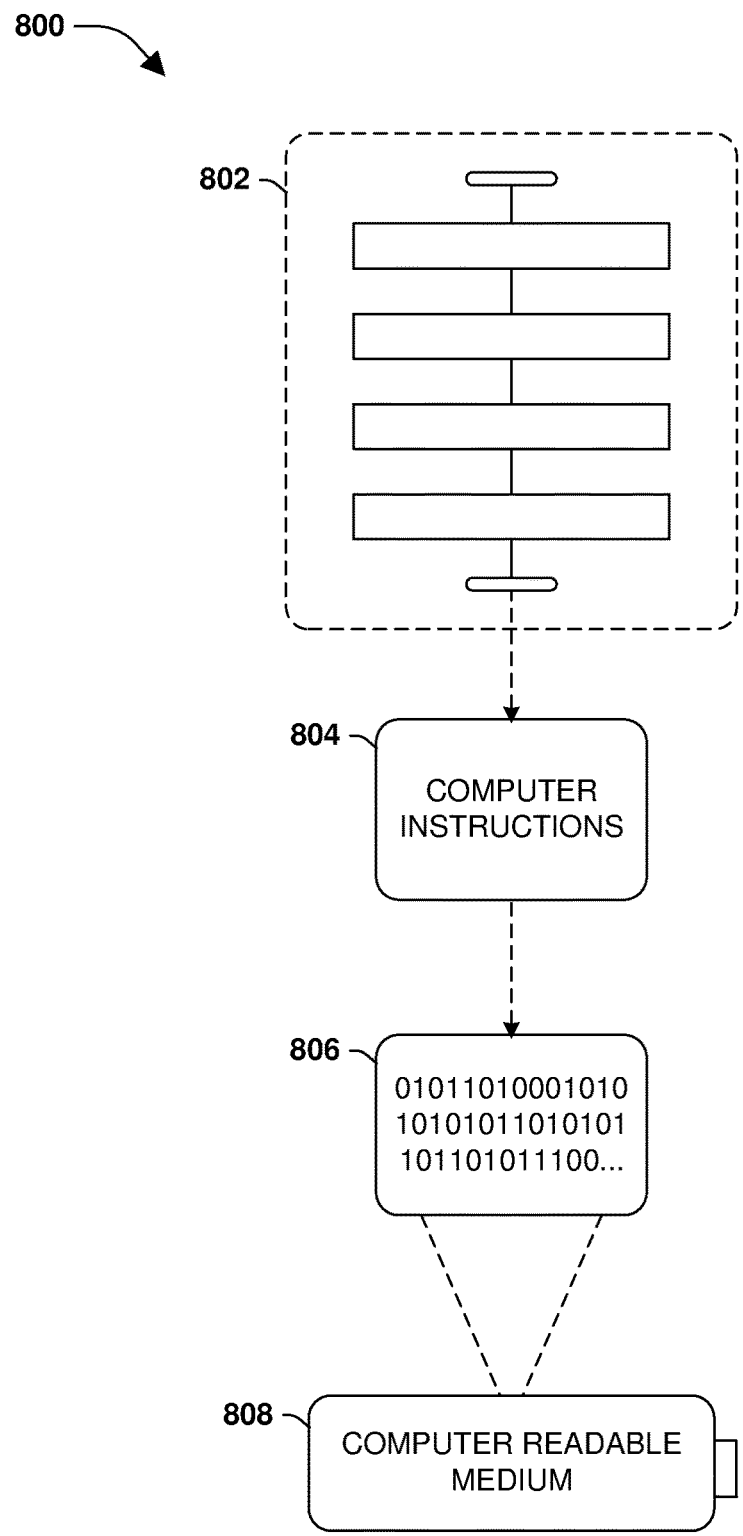
FIG. 8 is an example of a computer readable medium in which various embodiments of the present technology may be implemented.

FIG. 8 is an example of a computer readable medium 800 in which various embodiments of the present technology may be implemented. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. The computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform at least some of the exemplary methods 802 disclosed herein, such as method 200 of FIG. 2, for example. In some embodiments, the processor-executable computer instructions 804 are configured to implement a system, such as at least some of the exemplary systems disclosed herein, such as system 300 of FIGS. 3A-3C, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for splitting a clone volume from a parent volume whose data is stored in an object store using one or more parent objects, comprising:
   utilizing a transfer map to track mappings of selectively created child object identifiers used to subsequently copy the one or more parent objects to create child objects corresponding to the child object identifiers;
   performing a consistency point phase, wherein for each child object identifier:
      setting an object state for a corresponding child object to a copy pending state; and
      populating a reverse map with a reverse map entry includes at least one of a child object identifier for the child object, a parent object identifier of a parent object to copy as the child object, a sequence number of the parent object, or an identifier of the parent object; and
   traversing the transfer map to copy the one or more parent objects as the child objects for splitting the clone volume from the parent volume, wherein the reverse map is used to verify that the child objects are successfully created with valid data.

2. The method of claim 1, wherein the traversing comprises:
   in response to the transfer map indicating that the parent object has not yet been encountered, creating the child object identifier and populating the transfer map with an entry mapping the child object identifier to the parent identifier of the parent object.

3. The method of claim 1, wherein the traversing comprises:
   in response to the transfer map indicating that the parent object has not yet been encountered, creating the child object identifier and update a clone container corresponding to the clone volume with a cloud block number for the child object identifier.

4. The method of claim 1, wherein the traversing comprises:
   in response to the transfer map indicating that the parent object was encountered, refraining from creating a new child object identifier with respect to a current block of the parent object being evaluated by the traversal.

5. The method of claim 1, wherein the traversing comprises:
   in response to determining that an object block information hash does not have a hash entry for the child object identifier created during the traversal, adding the child object identifier and a parent object identifier block information into the object block info hash.

6. The method of claim 1, wherein the traversing comprises:
   in response to determining that an object block information hash includes a hash entry for the child object identifier created during the traversal, updating a reference count for the hash entry.

7. The method of claim 1, wherein performing the consistency point phase comprises:
   incrementing a reference count of the parent object to be copied.

8. The method of claim 1, wherein performing the consistency point phase comprises:
in response to the parent object being a copy of a different object, populating the reverse map entry with information from a parent reverse map of the parent object; and
in response to the parent object not being the copy of the different object, populating the reverse map entry with information from the parent object.

9. The method of claim 1, further comprises:
obtaining the child object identifier from the transfer map;
initializing the child object;
adding the child object identifier to a pending queue; and
transmitting a copy operation to the object store to copy the parent object as the child object, wherein the child object identifier is removed from the pending queue based upon the child object being verified.

10. A computing device comprising:
a memory storing instructions for performing a method for splitting a clone volume from a parent volume whose data is stored in an object store using one or more parent objects; and
a processor coupled to the memory, the processor configured to execute the instructions to perform operations comprising:
utilizing a transfer map to track mappings of selectively created child object identifiers used to subsequently copy the one or more parent objects to create child objects corresponding to the child object identifiers;
performing a consistency point phase, wherein for each child object identifier:
setting an object state for a corresponding child object to a copy pending state; and
populating a reverse map with a reverse map entry includes at least one of a child object identifier for the child object, a parent object identifier of a parent object to copy as the child object, a sequence number of the parent object, or an identifier of the parent object; and
traversing the transfer map to copy the one or more parent objects as the child objects for splitting the clone volume from the parent volume, wherein the reverse map is used to verify that the child objects are successfully created with valid data.

11. The computing device of claim 10, wherein the operations comprise:
obtaining the child object identifier from the transfer map;
initializing the child object; and
transmitting a copy operation to the object store to copy the parent object as the child object.

12. The computing device of claim 10, wherein the operations comprise:
in response to the transfer map indicating that the parent object has not yet been encountered by the traversal, creating the child object identifier and populating the transfer map with an entry mapping the child object identifier to the parent identifier of the parent object.

13. The computing device of claim 10, wherein the operations comprise:
in response to the transfer map indicating that the parent object has not yet been encountered by the traversal, creating the child object identifier and update a clone container with a cloud block number for the child object identifier.

14. The computing device of claim 10, wherein the operations comprise:
in response to the transfer map indicating that the parent object was encountered by the traversal while previously traversing a block within the parent object, refraining from creating a new child object identifier with respect to a current block of the parent object being evaluated by the traversal.

15. A non-transitory machine readable medium comprising instructions for performing a method for splitting a clone volume from a parent volume whose data is stored in an object store using one or more parent objects, which when executed by a machine, causes the machine to perform operations comprising:
utilizing a transfer map to track mappings of selectively created child object identifiers used to subsequently copy the one or more parent objects to create child objects corresponding to the child object identifiers;
performing a consistency point phase, wherein for each child object identifier:
setting an object state for a corresponding child object to a copy pending state; and
populating a reverse map with a reverse map entry includes at least one of a child object identifier for the child object, a parent object identifier of a parent object to copy as the child object, a sequence number of the parent object, or an identifier of the parent object; and
traversing the transfer map to copy the one or more parent objects as the child objects for splitting the clone volume from the parent volume, wherein the reverse map is used to verify that the child objects are successfully created with valid data.

16. The non-transitory machine readable medium of claim 15, wherein the operations comprise:
in response to the transfer map indicating that the parent object has not yet been encountered, creating the child object identifier and populating the transfer map with an entry mapping the child object identifier to the parent identifier of the parent object.

17. The non-transitory machine readable medium of claim 15, wherein the operations comprise:
in response to the transfer map indicating that the parent object has not yet been encountered, creating the child object identifier and update a clone container corresponding to the clone volume with a cloud block number for the child object identifier.

18. The non-transitory machine readable medium of claim 15, wherein the operations comprise:
in response to the transfer map indicating that the parent object was encountered, refraining from creating a new child object identifier with respect to a current block of the parent object being evaluated by the traversal.

19. The non-transitory machine readable medium of claim 15, wherein the operations comprise:
in response to determining that an object block information hash does not have a hash entry for the child object identifier created during the traversal, adding the child object identifier and a parent object identifier block information into the object block info hash.

20. The non-transitory machine readable medium of claim 15, wherein the operations comprise:
in response to determining that an object block information hash includes a hash entry for the child object identifier created during the traversal, updating a reference count for the hash entry.

* * * * *